(12) United States Patent
Narayanan et al.

(10) Patent No.: US 8,276,092 B1
(45) Date of Patent: Sep. 25, 2012

(54) METHOD AND SYSTEM FOR DISPLAYING FINANCIAL REPORTS

(75) Inventors: Najeeb T. Narayanan, Bangalore (IN); Ravi Subramaniam Iyer, Bangalore (IN)

(73) Assignee: Intuit Inc., Mountain View, CA (US)

( * ) Notice: Subject to any disclaimer, the term of this patent is extended or adjusted under 35 U.S.C. 154(b) by 992 days.

(21) Appl. No.: 12/023,735

(22) Filed: Jan. 31, 2008

(51) Int. Cl.
*G06F 3/048* (2006.01)

(52) U.S. Cl. ............ 715/772; 715/833; 705/30; 705/36

(58) Field of Classification Search .................. 715/772, 715/833, 212; 705/30, 36
See application file for complete search history.

(56) References Cited

U.S. PATENT DOCUMENTS

| | | | | |
|---|---|---|---|---|
| 5,918,217 A * | 6/1999 | Maggioncalda et al. | ... | 705/36 R |
| 6,477,538 B2 * | 11/2002 | Yaginuma et al. | | 1/1 |
| 7,050,997 B1 * | 5/2006 | Wood, Jr. | | 705/36 R |
| 7,206,768 B1 * | 4/2007 | deGroeve et al. | | 705/54 |
| 7,698,349 B2 * | 4/2010 | Hulen et al. | | 707/805 |
| 7,904,510 B2 * | 3/2011 | Anderson et al. | | 709/204 |
| 2002/0007330 A1 * | 1/2002 | Kumar et al. | | 705/36 |
| 2002/0130868 A1 * | 9/2002 | Smith | | 345/440 |
| 2005/0071259 A1 * | 3/2005 | Arai et al. | | 705/28 |
| 2005/0144096 A1 * | 6/2005 | Caramanna et al. | | 705/30 |
| 2005/0182709 A1 * | 8/2005 | Belcsak et al. | | 705/38 |
| 2007/0073606 A1 * | 3/2007 | Lai | | 705/37 |

\* cited by examiner

*Primary Examiner* — Phenuel Salomon
(74) *Attorney, Agent, or Firm* — Osha Liang LLP

(57) ABSTRACT

A method for reporting financial data includes displaying a report of the financial data at a first level of granularity and a report slider. The report includes a first plurality of line items. The report slider includes a sliding module in a first position, The method detects a first movement of a sliding module on the report slider from the first to second position, and generates a first sub-report for a first line item of the first plurality of line items and a second sub-report for a second line item of the first plurality of line items based on the second position of the sliding module. The first line item and the second line item are selected in the report. The first sub-report and the second sub-report display financial data are at a second level of granularity. The method displays the first sub-report and the second sub-report with the report.

25 Claims, 7 Drawing Sheets

METHOD AND SYSTEM FOR DISPLAYING FINANCIAL REPORTS

BACKGROUND

Every year millions of users (e.g., individuals, companies, and other institutions) receive, generate, and use reports. The reports provide a mechanism for the user to track and monitor the status of a user's business or personal finances. For example, the report may allow the user to project future growth and earnings, and appropriately allocate or reallocate finances, and provide information to co-owner's and investors.

In order to generate and review a report, a user may use a financial application. Financial applications gather data about financial transactions that occur over a specified duration and generate reports about the data. For example, a user may request a financial report from the financial application. In the request, the user may specify a time frame of financial transactions in the report, types of financial transactions, or any other desired information. In response to the request, the financial application collates the data and displays the report according to the request of the user.

SUMMARY

In general, in one aspect, the invention relates to a method for reporting financial data, that includes displaying a report of the financial data at a first level of granularity and a report slider, wherein the report comprises a first plurality of line items, and wherein the report slider comprises a sliding module in a first position, detecting a first movement of a sliding module on the report slider from the first position to a second position, generating a first sub-report for a first line item of the first plurality of line items and a second sub-report for a second line item of the first plurality of line items based on the second position of the sliding module, wherein the first line item and the second line item are selected in the report, and wherein the first sub-report and the second sub-report display financial data at a second level of granularity, and displaying the first sub-report and the second sub-report with the report.

In general, in one aspect, the invention relates to a system for reporting financial data, that includes a report slider that includes a sliding module, and a financial application configured to display a report of the financial data at a first level of granularity and the report slider, wherein the report comprises a first plurality of line items, and wherein the sliding module is in a first position, detect a first movement of the sliding module on a report slider from the first position to a second position, generate a first sub-report for a first line item of the first plurality of line items and a second sub-report for a second line item of the first plurality of line items based on the second position of the sliding module, wherein the first line item and the second line item are selected in the report, and wherein the first sub-report and the second sub-report display financial data at a second level of granularity, and display the first sub-report and the second sub-report with the report.

In general, in one aspect, the invention relates to a user interface that includes a report that includes a first plurality of line items, a report slider that includes a sliding module in a first position, a first sub-report for a first line item of the first plurality of line items, and a second sub-report for a second line item of the first plurality of line items, wherein the report of financial data is displayed at a first level of granularity based on a location of the report slider, wherein the first sub-report and the second sub-report are generated and displayed after a first movement of a sliding module on the report slider from a first position to a second position is detected, and wherein the first sub-report and the second sub-report display financial data at a second level of granularity.

In general, in one aspect, the invention relates to a computer readable medium that includes a plurality of executable instructions for reporting financial data, wherein the plurality of executable instructions comprises instructions to display a report of the financial data at a first level of granularity and a report slider, wherein the report comprises a first plurality of line items, and wherein the report slider comprises a sliding module in a first position, detect a first movement of a sliding module on the report slider from the first position to a second position, generate a first sub-report for a first line item of the first plurality of line items and a second sub-report for a second line item of the first plurality of line items based on the second position of the sliding module, wherein the first line item and the second line item are selected in the report, and wherein the first sub-report and the second sub-report display financial data at a second level of granularity, and display the first sub-report and the second sub-report with the report.

Other aspects of the invention will be apparent from the following description and the appended claims.

DETAILED DESCRIPTION

Figure 1:
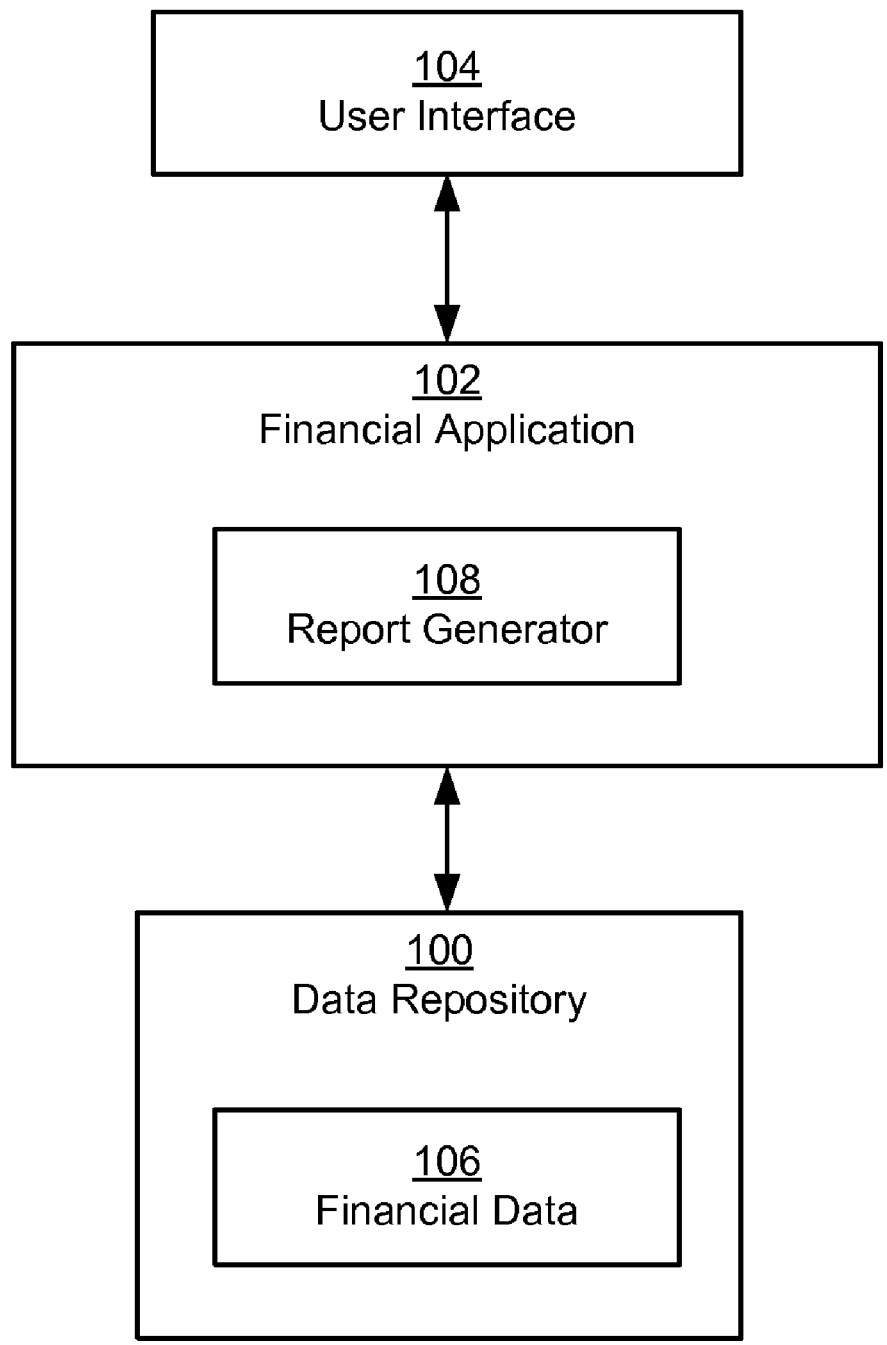
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for displaying financial reports. Specifically, embodiments of the invention allow a user to interact with a financial report having multiple line items. The user may adjust, on a per line item basis, the level of granularity of financial data displayed by moving a sliding module on a report slider (described below) that is displayed with the financial report. A user may select multiple line items and move the sliding module to generate sub-reports for the selected line items. Line items in the sub-reports show financial data at a finer granularity than line items in the report. Therefore, a user may switch between viewing the financial data at coarser granularity and viewing the financial data at a finer granularity for selected line items using the report slider FIG. 1 shows a schematic diagram of a system in accordance with one or more embodiments of the invention. As shown in FIG. 1, the system includes a data repository (100), a financial application (102), and a user interface (104). Each of these components is described below.

In one or more embodiments of the invention, the data repository (100) is a storage unit, such as a file, file system, database, or other system for storing financial data (106). The data repository (100) may be distributed across multiple vendors or financial institutions, stored with a single vendor or financial institution, or stored on the same computer system operated by the user. For example, the user may access the data repository using an Internet, Intranet, or from a local storage device.

Financial data (106) is data relevant to the finances of an individual, family, company, or other group. For example, the financial data (106) may include financial transaction data (e.g., data about particular income, expenses, and/or other data), status information (e.g., married, homeowner, age, and/or any status information), account information (e.g., name of financial accounts, data defining how to access the account, current balance, and/or other account details), or any other financially related data.

A financial application (102) is connected to the data repository in accordance with one or more embodiments of the invention. The financial application (102) includes functionality to assist users in financial management. For example, a financial application may be an accounting application, a tax preparation application, a payroll application, an invoicing application, or any other type of financial application. The financial application may execute locally (e.g., on the computer system or mobile device of the user) or remotely, such as from a server. In one or more embodiments of the invention, the financial application (102) includes a report generator (108).

In one or more embodiments of the invention, a report generator (108) includes functionality to generate a report (i.e., a visual tool that describes a series of financial transactions). The report is described below and in FIG. 2. Specifically, a report generator (108) includes functionality to receive a request from a user and generate a report based on the request. In one or more embodiments of the invention, the report generator (108) includes functionality to dynamically generate and update reports. Specifically, while the user is interacting with the report, the report generator (108) includes functionality to update the report according to the user's interactions.

The financial application (102) with the report generator (108) is connected to a user interface (104). The user interface (104) includes functionality for the user to interact with the report, in accordance with one or more embodiments of the invention.

Figure 2:
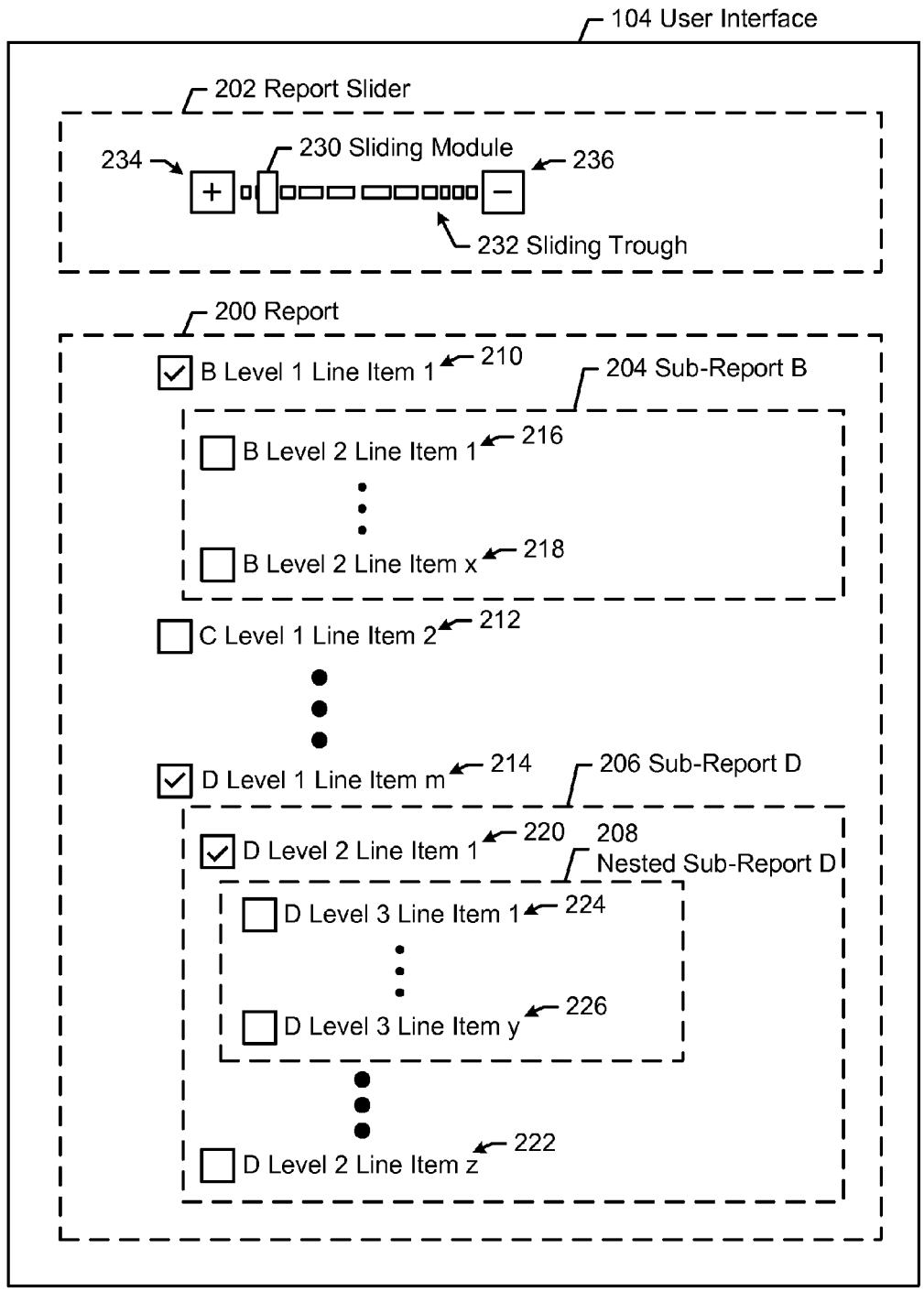
FIG. 2 shows a user interface in accordance with one or more embodiments of the invention.

FIG. 2 shows a user interface (104) in accordance with one or more embodiments of the invention. As shown in FIG. 2, the user interface (104) includes a report (200) and a report slider (202).

As stated above, a report (200) is a visual tool describing a series of transactions. In one or more embodiments of the invention, the report (200) is displayed as a list of line items. A line item represents a grouping of financial data. The grouping may be according to a specific time frame (e.g., during 2007, during April 2007, or any other time frame), a specific category (e.g., necessities, luxuries, automobile repair, housing, and/or other user-selected category), a specific class (e.g., taxable, non-taxable, income, expense, asset), a type of financial account (e.g., savings bonds, investments, credit cards), or any other specified grouping of financial data.

The amount in which financial data is grouped for a line item defines the level of granularity of financial data for the report. Specifically, a level of granularity represents the degree in which financial data is grouped. For example, grouping financial data at a coarser level of granularity merge more financial data into a line item than grouping financial data at a finer level of granularity.

The report (200) may include line items that group financial data at a variety of levels of granularity. As shown in example FIG. 2, the report (200) displays line items at level 1 granularity (e.g. B level 1 line item 1 (210), C level 1 line item 2 (212), D level 1 line item m (214)), line items at level 2 granularity (e.g., B level 2 line item 1 (216), B level 2 line item x (218), D level 2 line item 1 (220), D level 2 line item z (222)), and line items at level 3 granularity (e.g., D level 3 line item 1 (224), D level 3 line item y (226)).

In one or more embodiments of the invention, financial data is initially grouped into line items at level 1 granularity (e.g. B level 1 line item 1 (210), C level 1 line item 2 (212), D level 1 line item m (214)). Each line item at level 1 granularity (e.g. B level 1 line item 1 (210), C level 1 line item 2 (212), D level 1 line item m (214)) may have a sub-report (e.g., sub-report B (204), sub-report D (206)) for the line item. The sub-report (e.g., sub-report B (204), sub-report D (206)) groups financial data into line items at a finer level of granularity. Specifically, the sub-report describes financial data for only the line item for which the sub-report is generated. For example, if the line items in level 1 granularity describes the amount saved each year on a per year basis (e.g., total amount saved in 2006, total amount saved in 2007, total amount saved in 2008, etc.), then a sub-report may describe the amount saved for a particular year on a per month basis (e.g., total amount saved in January 2006, total amount saved in February 2006, ..., total amount saved in December 2006).

Similar to line items at level 1 granularity, line items in the sub-report may also have a sub-report generated for the line item. As shown in the example FIG. 2, D level 2 line item 1 (220) has a sub-report (i.e., nested sub-report D (208)) displayed for the line items. Thus, virtually any line item in the report may have a sub-report generated for the line item to display the financial data at a finer level of granularity. Therefore, the report (200) may include a nesting of sub-reports (e.g., one sub-report may exist for a line item in another sub-report which may exist for a line item in another sub-report and so on). Such nesting of reports (i.e., report (200), sub-report D (206), nested sub-report D (208)) may continue until the line items in the final nested sub-report group financial data at the finest level of granularity (e.g., each line item represents an individual transaction). Alternatively, the nesting of reporting may stop when another condition is achieved, such as lack of space in the user interface, user or system specified parameter, etc. The amount of nesting of sub-reports corresponds to the level of granularity of financial data that is displayed in a report for the line item for which the nested sub-reports are generated.

In one or more embodiments of the invention, the sub-report (e.g., sub-report B (204), sub-report D (206), nested sub-report D (208)) may group financial data using a different grouping scheme than the report (200). For example, the sub-report may group transactions temporally (e.g., according to year) while the report groups transactions categorically (e.g., restaurant, retail, and other such categories). In one or more embodiments of the invention, the manner in which line items are grouped may be specified by the user in the request for the report.

As shown in FIG. 2, each line item is associated with a selection box in accordance with one or more embodiments of the invention. The user may use the selection box to select the line item corresponding to the selection box. In one or more embodiments of the invention, more than one selection box may be selected by the user. For example, as shown in FIG. 2, the selection box for B level 1 line item 1 (210), D level 1 line item m (214), and D level 2 line item 1 (220) are all simultaneously selected. Although FIG. 2 shows a box shape selection box, one skilled in the art will appreciate that any shape for the selection box may be used.

In one or more embodiments of the invention, the user interface (104) includes a report slider (202). The report slider (202) allows the user to change the level of financial data displayed in the report by adding or hiding nested sub-reports generated for line items. Using the report slider (202) the user may select the level of granularity to display financial data for selected line items. The report slider (202) includes a sliding module (230) and a sliding trough (232).

The sliding trough (232) is a visual tool that constrains the movement of the sliding module (230) to along the path of the sliding trough (232). Thus, as shown in the example FIG. 2, the sliding module may be moved toward the left (i.e., toward the plus button (234)) or toward the right (i.e., toward the minus button (236)). One end of the sliding trough (232) corresponds to a finer level of granularity (e.g., the end on the left in FIG. 2) while another end of the sling trough (232) corresponds to a coarser level of granularity (e.g., the end on the right in FIG. 2) or vice-versa.

While FIG. 2 shows one possible appearance of the sliding trough (232), one skilled in the art will appreciate that the appearance may be different than shown in FIG. 2. For example, the sliding trough may be a thick or thin straight line, a line with tick marks, a curved line, or any other such shape.

The sliding module (230) is a user interface tool that allows the user to change the level of granularity (i.e., add or remove nesting of sub-reports) of financial data that is displayed for selected line items. For example, consider the scenario in which neither sub-report D (206) nor nested sub-report D (208) is displayed and the sliding module is closer to the minus sign (236) than to the plus sign (234) in the example FIG. 2. In the example, the user may select D level 1 line item m (214) and move the sliding module partly toward the left to view sub-report D (206) for D level 1 line item m (214). Further, in the example, the user may, with D level 1 line item m (214) selected, move the sliding module farther to the left to view a sub-report D (e.g., nested sub-report D (208)) for each line item (e.g., D level 2 line item 1 (220), D level 2 line item z (222)) in the sub-report D (206). As shown in the example, by moving the sliding module, the user can increase or decrease the amount of nesting of sub-reports for D level 1 line item m (214) and, therefore, the level of granularity of financial data displayed in the report (200).

In one or more embodiments of the invention, such as the embodiments shown in FIG. 2, the position of the sliding module (230) on the sliding trough (232) when not moved by the user may represent the amount of nesting of sub-reports displayed for the report (200). In particular, the position may represent the greatest amount of nesting of line items in the report (200). Alternatively, the position may represent the greatest amount of nesting of only selected line items in the report (200). In another alternative, the sliding module (230) may re-center on the sliding trough (232) after movement by the user. In the alternative, the position of the sliding module (230) on the sliding trough (232) is not reflective of the level of granularity or the amount of nesting displayed in the report (200).

The report slider (202) may also include a plus button (234) and a minus button (236) in accordance with one or more embodiments of the invention. The plus button (234) and the minus button (236) incrementally adds (i.e. reveals) or hides sub-reports for selected line items.

Although FIG. 2 shows that increasing the level of granularity occurs by moving the sliding module (230) to the left and having the plus button (234) on the left of the sliding trough (232), increasing the level of granularity may occur by moving the sliding module (230) to the right and having the plus button (234) on the right of the sliding trough (232). Further, the sliding trough (232) may be vertical rather than horizontal as shown in FIG. 2.

Further, while not shown in FIG. 2, the user interface (104) may include additional user interface components, such as a back button to return to the financial application, a select all button to select all line items in the report, a default report button to return to the initial report that was displayed, a menu bar, an other such components of a user interface.

Figure 3:
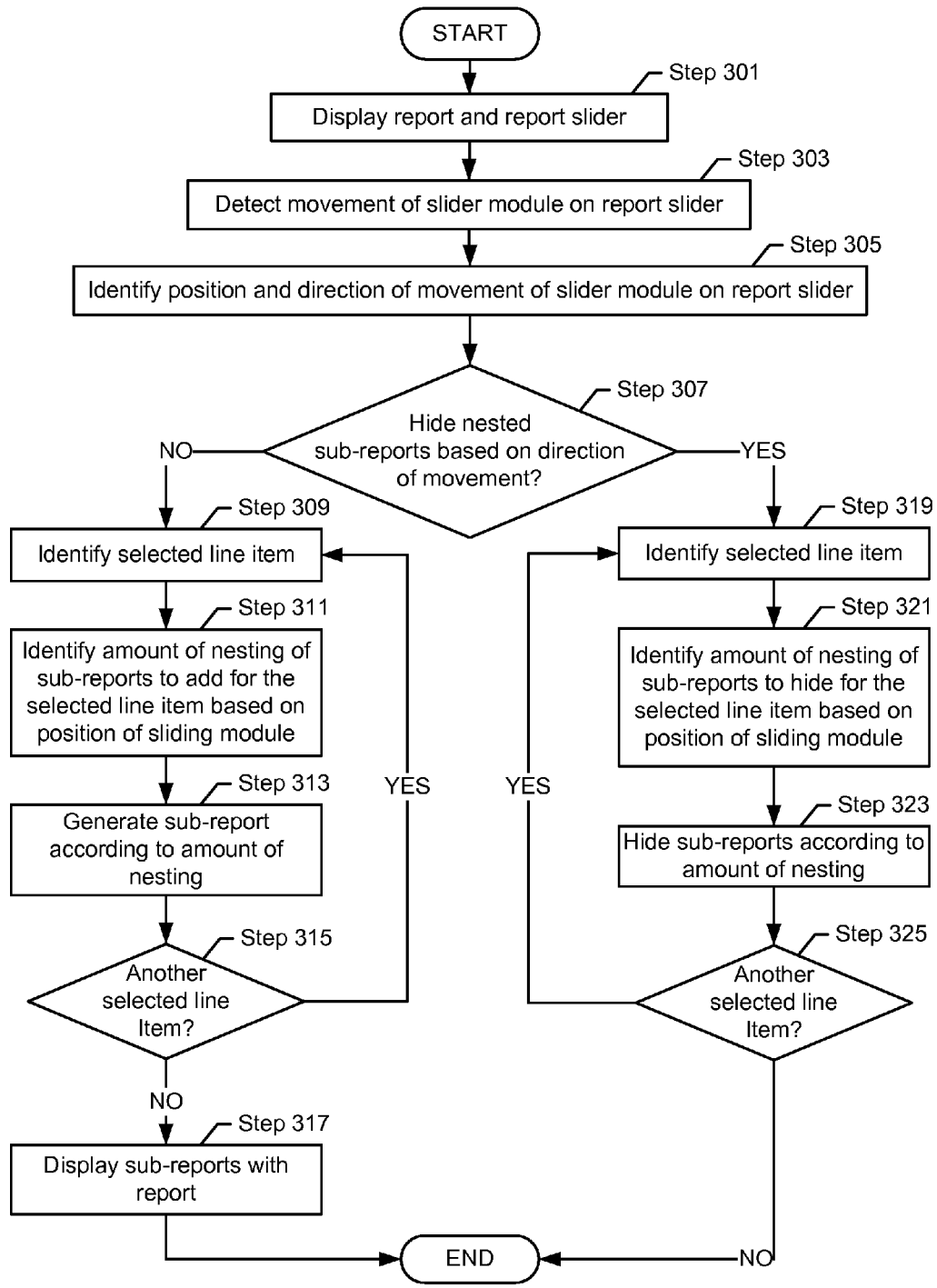
FIG. 3 shows a flowchart of a method in accordance with one or more embodiments of the invention.

FIG. 3 shows a flowchart of a method in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. FIG. 3 shows a flowchart of a method for the financial application to adjust the level of granularity of financial data displayed in a report in accordance with one or more embodiments of the invention.

Initially, a report and a report slider are displayed (Step 301). Specifically, the financial application may receive a request from a user for displaying a report. Parameters in the request may specify, for example, the type of report to display, how financial data is grouped in the report, the type of financial data, and other such parameters. Based on the request, the report generator generates a report. In particular, the report generator obtains financial data and performs any computations or functions necessary to generate the report. In one or more embodiments of the invention, at this stage, the report generated by the report generator only includes line items at the coarsest level of granularity. Specifically, the initial report only includes level 1 line items in accordance with one or more embodiments of the invention. Alternatively, the default report (i.e., the report that is initially displayed) may include a default amount of nesting of sub-reports. The user interface displays the report and the report slider.

After displaying the report and the report slider, a movement of the sliding module on the report slider is detected (Step 303). At this stage, the user has moved the sliding module along the sliding trough. The detection of movement of the sliding module may be performed using any method well-known in the art of user interfaces. For example, the pixel location of components in the sliding module is identified and translated into x-y coordinates; these coordinates are then compared to determine movement.

In response to detecting the movement of the sliding module, the position and direction of movement of the sliding module on the report slider is identified (Step 305). In particular, the position that the user moves the sliding module to dictates the amount of nesting of sub-reports to add (i.e. reveal) or hide from the report. The direction of the movement dictates whether to add (i.e. reveal) or hide sub-reports.

Accordingly, a determination is made based on the direction of movement of the sliding module whether to hide (or add (i.e. reveal)) nested sub-reports in the report (Step 307). As discussed above with reference to FIG. 2, one side of the slider trough increases the coarseness of the level of granularity of financial data in the report while another side increases the fineness of the level of granularity of financial data in the report. If the user moves the sliding module to increase the coarseness of financial data displayed in the report, then the determination is made to hide nested sub-reports in the report. Inversely, if the user moves the sliding module to increases the fineness of the level of granularity, then the determination is made to add (i.e. reveal) nested sub-reports to the report. Therefore, the determination whether to hide nested sub-reports may be made based on the movement of the sliding module in the direction of one side of the sliding trough or the other.

If a determination is made that the movement of the sliding module is in the direction to add (i.e. reveal) nested sub-reports to the report, then a selected line item is identified (Step 309). At this stage, the user interface identifies which line item is selected.

Further, the amount of nesting of sub-reports to add (i.e. reveal) for the selected line item is identified based on position of sliding module (Step 311). In one or more embodiments of the invention, the sliding trough includes discrete positions that may be identified as the position of the sliding module. Specifically, although the sliding trough may appear continuous to the user, the possible positions of the sliding module that can be identified is discrete. Each of the possible positions of the sliding module on the sliding trough may be associated with an amount of nesting. The difference in the number of positions that the sliding module is moved by the user indicates the number nested sub-reports to add to the report. For example, when the user moves the sliding module to three positions in the direction to add (i.e. reveal) levels of granularity, then the user indicates to add (i.e. reveal) three levels of nested sub-reports for each of the selected line items.

Accordingly, the sub-report(s) is generated based on the identified amount of nesting (Step 313). For example, if the position of the sliding module indicates to add one sub-report, then a sub-report is dynamically generated for the selected line item. Alternatively, if the position of the sliding module indicates to add two levels of nested sub-reports, then a first sub-report is generated for the selected line item. Further, a sub-report is generated for each line item in the first sub-report in accordance with one or more embodiments of the invention. Thus, the addition of nested sub-reports results in finer level of granularity of financial data that is generated. Generating the sub-reports may be performed as described above for generating a report. In particular, financial data for the sub-report is obtained and any computation or functions required is performed to obtain the sub-report. In one or more embodiments of the invention, the generation of sub-reports is performed only after the user requests the financial data to be displayed at a finer level of granularity.

After generating the sub-report(s), a determination is made whether another line item is selected (Step 315). If another line item is selected, then the method repeats for generating sub-reports for the next selected line item.

In one or more embodiments of the invention, the generated sub-reports are displayed with the report (Step 317). Displaying the generated sub-reports may be performed after generating all of the sub-reports for each of the selected line items as shown in FIG. 3 or while generating each sub-report.

As an alternative in Step 307, if a determination is made to hide nested sub-reports, then a selected line item is identified (Step 319). Next, the amount of nesting of sub-reports to hide for the selected line item is identified based on position of sliding module (Step 321). Identifying the amount of nesting to hide may be performed in a manner similar to identifying the amount of nesting to add in accordance with one or more embodiments of the invention. Specifically, the difference between the previous position of the sliding module and the current position of the sliding module indicates the number of levels of nesting to hide.

Accordingly, the sub-reports for the selected line item are hidden according to the amount of nesting (Step 323). For example, if a determination is made to hide three levels of granularity from the report, then the three levels of nesting in the sub-reports are hidden for the selected line item. In one or more embodiments of the invention, if the selected line item does not have three levels of nesting of sub-reports, then the maximum number of levels of nesting is hidden such that the selected line item remains displayed.

After hiding the sub-report(s), a determination is made whether another line item is selected (Step 325). If another line item is selected, then the method repeats for hiding sub-reports for the next selected line item.

In one or more embodiments of the invention, the user may continue to select line items and move the sliding module to change the level of granularity of financial data generated for the report. As the user moves the sliding module, the financial application may repeat the flowchart with Step 303 to update the report.

Figure 4A:
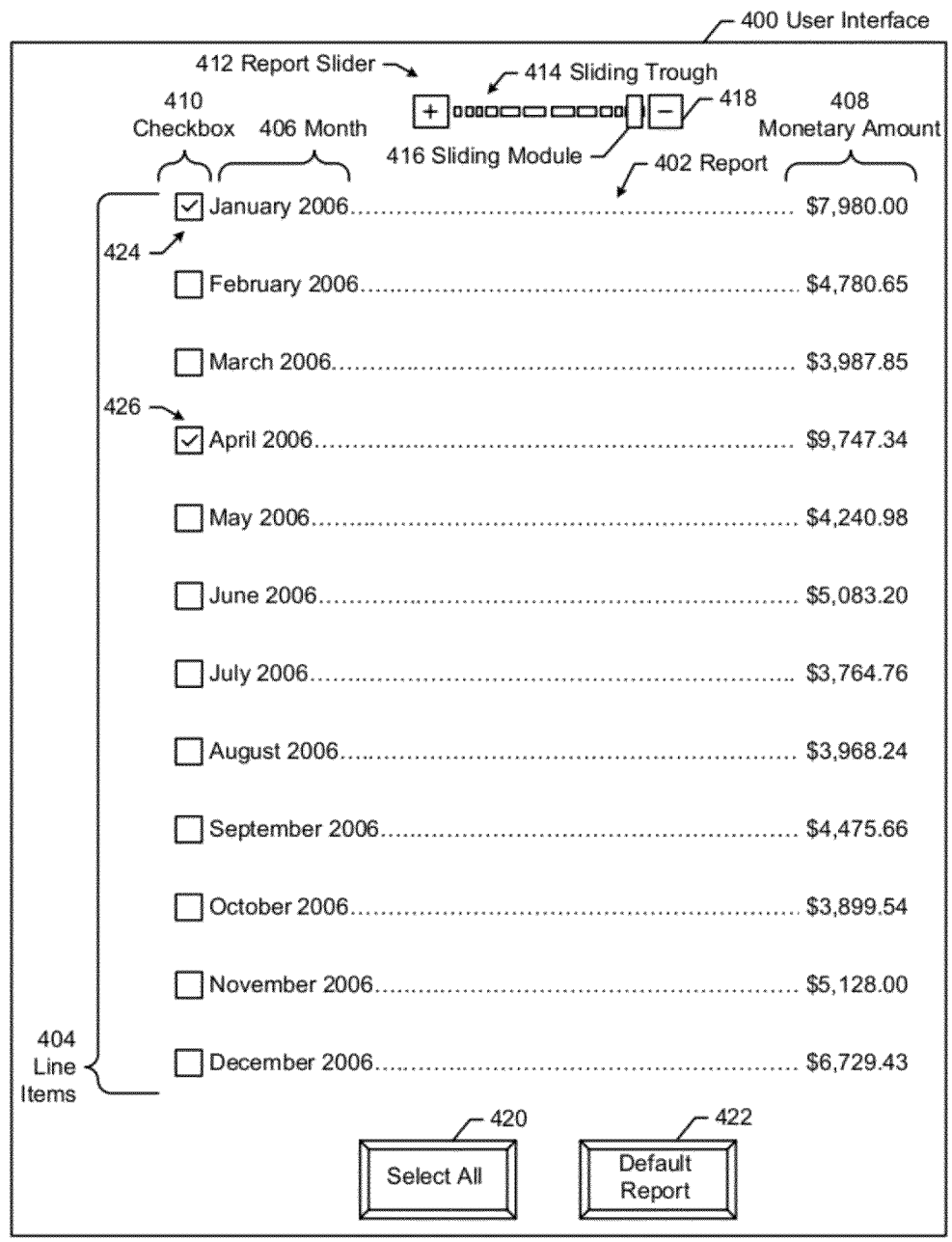
FIGS. 4A-4C show an example in accordance with one or more embodiments of the invention.
Figure 4B:
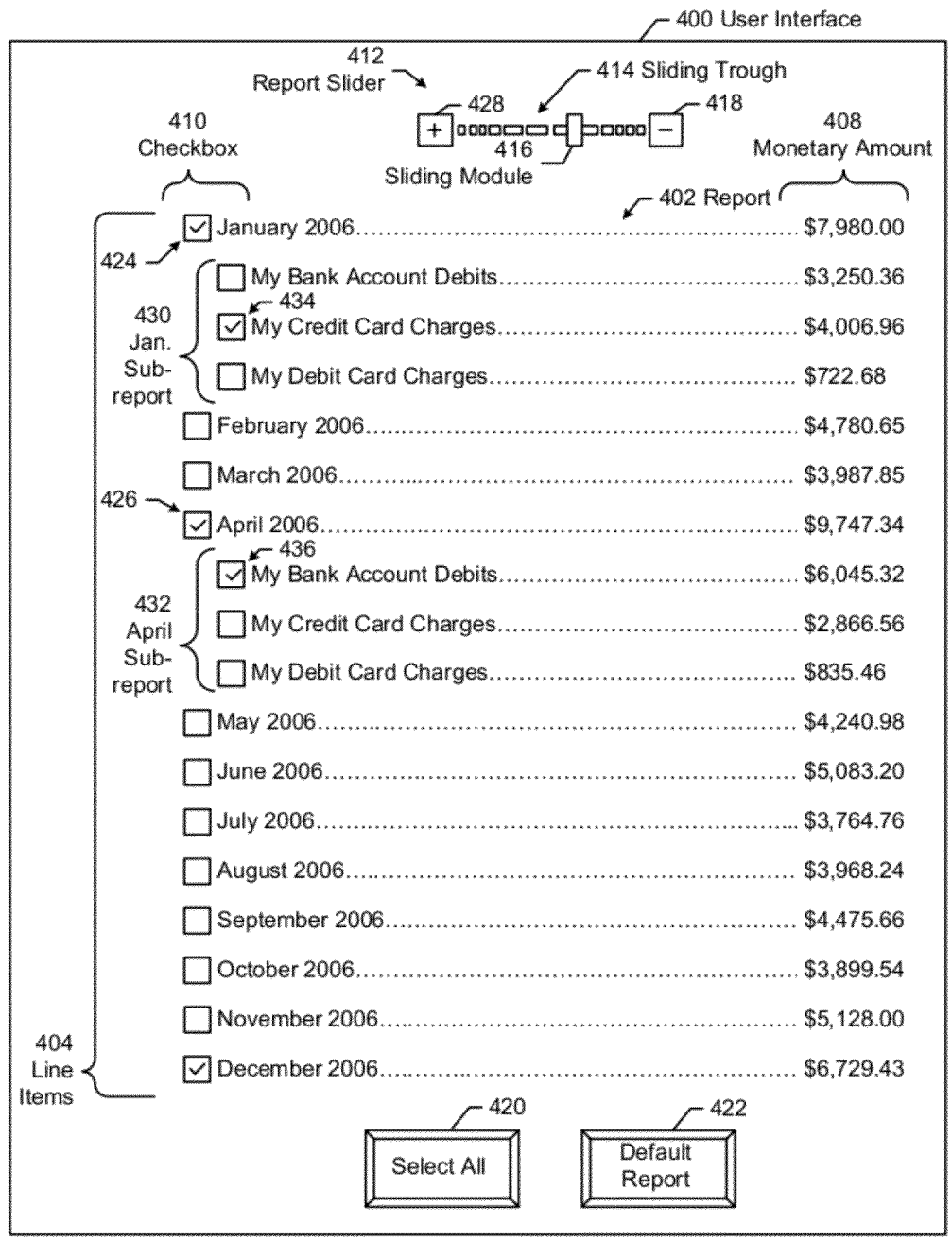
Figure 4C:
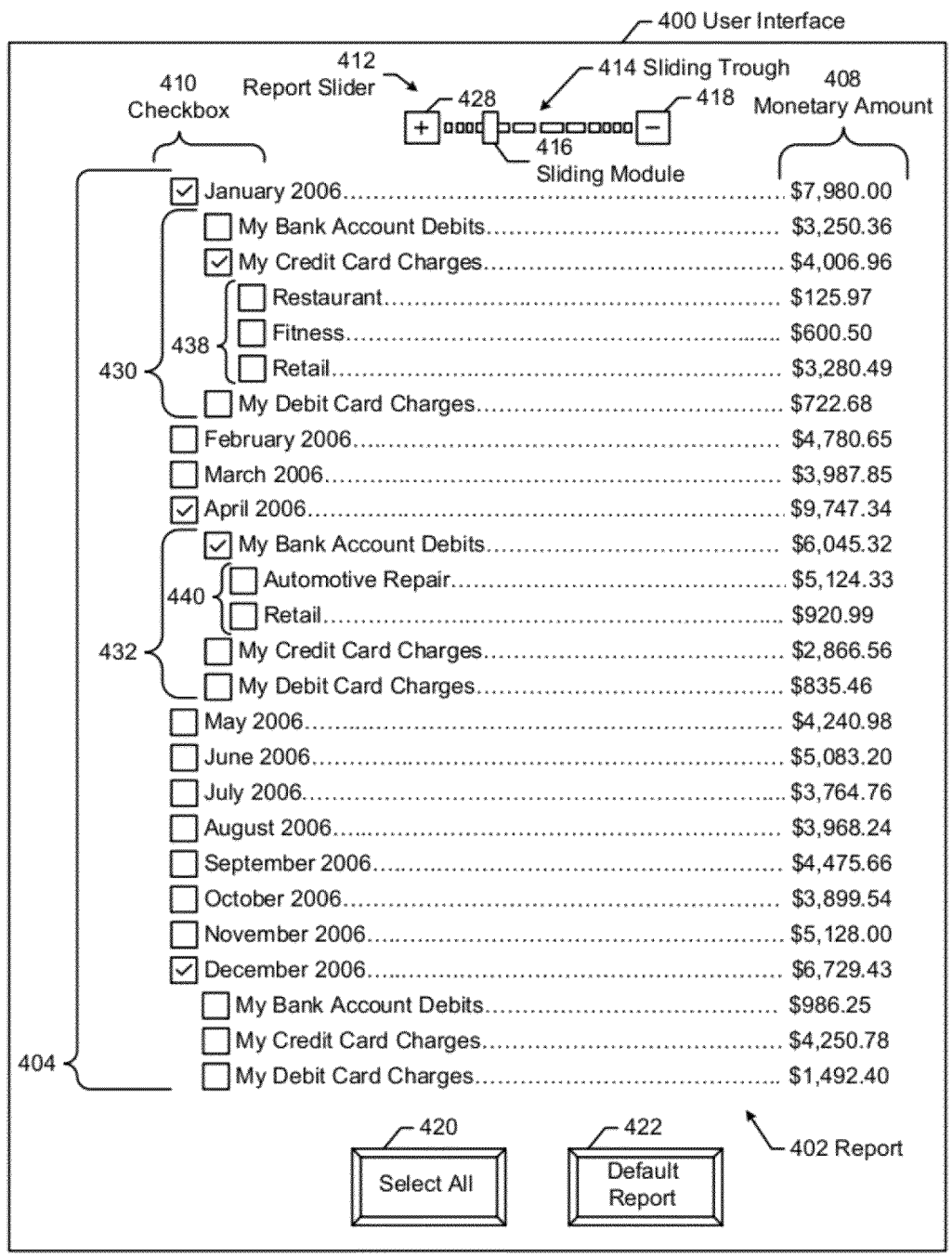

The following examples are intended for exemplary purposes only and not intended to limit the scope of the invention. In the following example, consider the scenario in which a user wants a report of the amount of money spent in 2006. FIGS. 4A-4C show an example user interface (400) in accordance with one or more embodiments of the invention. FIG. 4A shows the user interface (400) with the report (402) showing a default level of granularity for each of the line items (404). Specifically, each line item (404) includes an identifier of the month (406) and a monetary amount (408). In the example, the monetary amount (408) shows the total amount of money spent for the corresponding month. Further, each line item (404) includes a checkbox (410). The checkbox (410) is a type of selection box that allows the user to select the line item.

In the example, the user interface (400) includes a report slider (412). The report slider (412) includes a sliding trough (414) and a sliding module (416) that slides along the sliding trough (414). As shown in FIG. 4A, the sliding module (416) is at the far right of the sliding trough (414), next to the minus button (418) to indicate that the report displayed in the user interface displays financial data at the coarsest level of granularity.

In addition to the report (402) and the report slider (412), the user interface (400) also includes a select all button (420) and a default report button (422). The select all button (420) allows the user to select all line items (404) in the report. The default report button (422) allows the user to view the default report (currently shown).

While viewing the report (402) shown in FIG. 4A, the user may note that most of the monetary amounts (408) displayed are within the range of $3,000 to $7,000. However, the user may further note that in January 2006 and in April 2006, the monetary amount (408) spent exceeded $7,000. Accordingly, the user may select the selection box for the January 2006 line item (424) and the selection box for the April 2006 line item (426). Further, the user may move the position of the sliding module (416) on the report slider (412) to the position shown in FIG. 4B.

As shown in FIG. 4B, by selecting the selection box for the January 2006 line item (424) and the selection box for the April 2006 line item (426) and moving the sliding module (416) closer to the plus button (428), a sub-reports (i.e., January sub-report (430) and April sub-report (432)) is generated for each of the selected line items. The sub-report displays the expense data for January 2006 and for April 2006 at a finer level of granularity than the default report. Specifically, the user may view the bank account debits, the credit card charges, and the debit card charges for both January 2006 and April 2006. While viewing the sub-reports (i.e., January sub-report (430) and April sub-report (432)), the user may note that credit card charges were higher than normal in January 2006, and debits from the bank account were higher than normal in April 2006. Accordingly, the user may select the selection box for the credit card charges in January 2006 line item (434) and the selection box for the bank account in April 2006 line item (436). Further, the user may move the position of the sliding module (416) on the report slider (412) to the position shown in FIG. 4C.

As shown in FIG. 4B, by selecting the selection box for the credit card charges in January 2006 line item and the selection box for the bank account in April 2006 line item and moving the sliding module (416) closer to the plus button (428), a sub-report (i.e., nested sub-report (438), nested sub-report (440)) is generated for each of the selected line items. After viewing the sub-report for the credit card charges in January 2006, the user may remember that in January the user was following through on a New Year's resolution to loose weight and had purchased $3,280.49 in fitness gear and $600.50 in a new gym membership. After viewing the sub-report for the bank account debits in April 2006, the user may remember that the user was in a car accident and had to pay $5,124.33 to fix the car. As shown in the example, by allowing the user to choose what level of granularity to display financial data on a per line item basis, the user may not be overburdened with more information than required.

Figure 5:
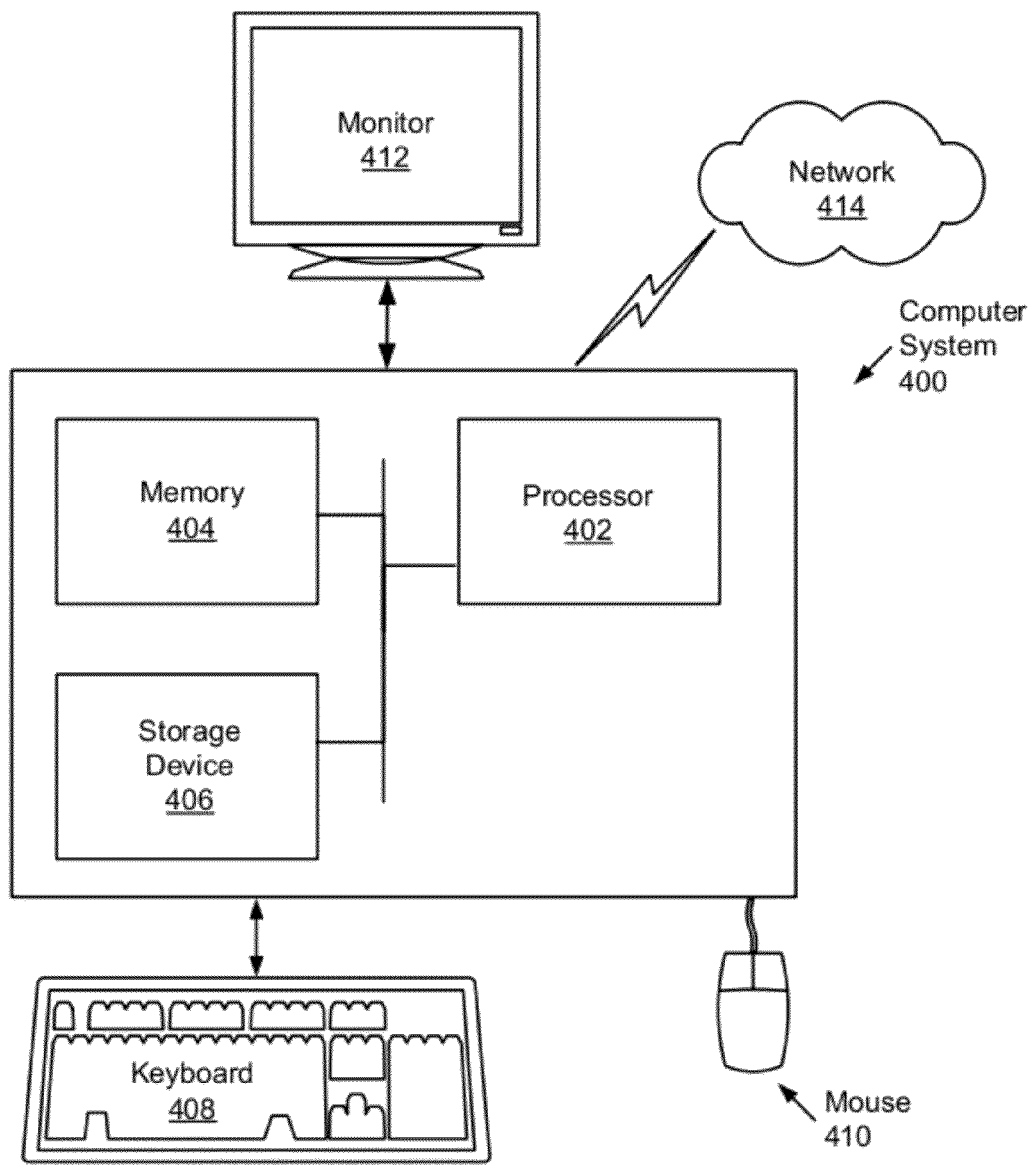
FIG. 5 shows a computer system in accordance with one or more embodiments of the invention.

Embodiments of the invention may be implemented on virtually any type of computer regardless of the platform being used. For example, as shown in FIG. 5, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., data repository, financial application, user interface, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for reporting financial data, comprising:
displaying a report of the financial data at a first level of granularity of a plurality of levels of granularity and a report slider,
wherein the report comprises a first plurality of line items,
wherein the report slider comprises a sliding module in a first position,
wherein each of the plurality of levels of granularity define a level of detail about selected line items of the first plurality of line items;
receiving a selection of a first line item and a second line item of the first plurality of line items;
detecting a first movement of the sliding module on the report slider from the first position to a second position,
wherein the second position of the sliding module with respect to the report slider defines a second level of granularity of the plurality of levels of granularity of the financial data of the first line item and the second line item,
wherein the second level of granularity provides an additional level of detail for the first line item and the second line item, and
wherein the additional level of detail comprises a plurality of components of the first line item and the second line item;
generating, based on the second position of the sliding module and the selection of a first line item and a second line item, a first sub-report for the first line item and a second sub-report for the second line item, wherein the first sub-report and the second sub-report display the financial data of the first line item and the second line item at the second level of granularity; and
displaying the first sub-report and the second sub-report with the report.

2. The method of claim 1, wherein generating the second sub-report comprises a monetary amount for one of a second plurality of line items, wherein the second sub-report comprises the second plurality of line items.

3. The method of claim 1, further comprising: detecting a second movement of the sliding module on the report slider to a third position; and displaying a third sub-report for a third line item of a second plurality of line items based on the third position of the sliding module, wherein the first sub-report comprises the second plurality of line items.

4. The method of claim 3, wherein the first sub-report and the third sub-report are displayed hierarchically under the first line item and the third line item.

5. The method of claim 3, further comprising:
detecting a third movement of the sliding module on the report slider from the first position to a fourth position, wherein the fourth position is to the left of the first position, the second position, and the third position of the sliding trough on the report slider; and displaying, based on the fourth position and the selection of the first line item, the first sub-report, the third sub-report, and a fourth sub-report for a third plurality of line items, wherein the third sub-report comprises the third plurality of line items.

6. The method of claim 1, wherein the report slider comprises a sliding trough along which the sliding module moves, wherein the second position on the sliding trough is to the left of the first position on the sliding trough.

7. The method of claim 6, wherein the first movement of the sliding module results in revealing the first sub-report.

8. The method of claim 6, wherein moving the sliding module from the second position on the sliding trough to the right along the sliding trough to the first position results in hiding the first sub-report.

9. A system for reporting financial data, comprising:
a computer processor; and
a financial application executing on the computer processor and configured to:
  display a report of the financial data at a first level of granularity of a plurality of levels of granularity and a report slider,
    wherein the report comprises a first plurality of line items,
    wherein the report slider comprises a sliding module,
    wherein the sliding module is in a first position, and
    wherein each of the plurality of levels of granularity define a level of detail about selected line items of the first plurality of line items;
  receive a selection of a first line item and a second line item of the first plurality of line items;
  detect a first movement of the sliding module on a report slider from the first position to a second position,
    wherein the second position of the sliding module with respect to the report slider defines a second level of granularity of the plurality of levels of granularity of the financial data of the first line item and the second line item,
    wherein the second level of granularity provides an additional level of detail for the first line item and the second line item, and
    wherein the additional level of detail comprises a plurality of components of the first line item and the second line item;
  generate, based on the second position of the sliding module and the selection of a first line item and a second line item, a first sub-report for the first line item and a second sub-report for the second line item, wherein the first sub-report and the second sub-report display the financial data of the first line item and the second line item at the second level of granularity; and
  display the first sub-report and the second sub-report with the report.

10. The system of claim 9, wherein generating the second sub-report comprises a monetary amount for one of a second plurality of line items, wherein the second sub-report comprises the second plurality of line items.

11. The system of claim 9, wherein the financial application is further configured to: detect a second movement of the sliding module on the report slider to a third position; and display a third sub-report for a third line item of a second plurality of line items based on the third position of the sliding module, wherein the first sub-report comprises the second plurality of line items.

12. The system of claim 11, wherein the first sub-report and the third sub-report are displayed hierarchically under the first line item and the third line item.

13. The system of claim 11, wherein the financial application is further configured to:
  detect a third movement of the sliding module on the report slider from the first position to a fourth position, wherein the fourth position is to the left of the first position, the second position, and the third position of the sliding trough on the report slider; and
  display, based on the fourth position and the selection of the first line item, the first sub-report, the third sub-report, and a fourth sub-report for a third plurality of line items, wherein the third sub-report comprises the third plurality of line items.

14. The system of claim 9, wherein the report slider comprises a sliding trough along which the sliding module moves, wherein the second position on the sliding trough is to the left of the first position on the sliding trough.

15. The system of claim 14, wherein the first movement of the sliding module results in revealing the first sub-report.

16. The system of claim 14, wherein moving the sliding module from the second position on the sliding trough to the right along the sliding trough to the first position results in hiding the first sub-report.

17. A system comprising:
a computer processor; and
a user interface executing on the computer processor and displaying:
  a report of financial data comprising a first plurality of line items, wherein the plurality of line items comprises a plurality of selection boxes;
  a report slider comprising a sliding module in a first position,
    wherein the first position of the sliding module with respect to the report slider defines a first level of granularity of a plurality of levels of granularity with respect to the financial data, and
    wherein each of the plurality of levels of granularity define a level of detail about selected line items of the first plurality of line items;
  a first sub-report for a first line item of the first plurality of line items,
    wherein the first sub-report is displayed in response to receiving a first selection of a first selection box of the plurality of selection boxes, and
    wherein the first selection box is associated with the first line item; and
  a second sub-report for a second line item of the first plurality of line items,
    wherein the second sub-report is displayed in response to receiving a second selection of a second selection box of the plurality of selection boxes,
    wherein the second selection box is associated with the second line item,
    wherein the first sub-report and the second sub-report are generated and displayed after a first movement of the sliding module on the report slider from the first position to a second position defining a second level of granularity of the plurality of levels of granularity is detected,
    wherein the second level of granularity provides an additional level of detail for the first line item and the second line item,
    wherein the additional level of detail comprises a plurality of components of the first line item and the second line item, and
  wherein the first sub-report and the second sub-report display, based on the second position of the sliding module, the first selection of the first selection box, and the second selection of the second selection box, the financial data of the first line item and the second line item at the second level of granularity of the plurality of levels of granularity.

18. The system of claim 17, wherein generating the second sub-report comprises a monetary amount for one of a second plurality of line items, wherein the second sub-report comprises the second plurality of line items.

19. The system of claim 17, the user interface further displaying: a third sub-report for a third line item of a second plurality of line items based on the third position of the sliding module, wherein the first sub-report comprises the second plurality of line items, and wherein the third sub-report is generated after movement of the sliding module on the report slider to a third position is detected.

20. The system of claim 19, wherein the first sub-report and the third sub-report are displayed hierarchically under the first line item and the third line item.

21. The system of claim 19, the user interface further displaying:
   a fourth sub-report for a fourth line item of a third plurality of line items based on the fourth position and the selection of the first line item, wherein the third sub-report comprises the third plurality of line items, wherein the first sub-report and the third sub-report are displayed with the fourth sub-report, and
   wherein the sliding module is moved on the report slider from the first position to a fourth position, wherein the fourth position is to the left of the first position, the second position, and the third position of the sliding trough on the report slider.

22. The system of claim 17, the user interface further displaying: a sliding trough along which the sliding module moves, wherein the second position on the sliding trough is to the left of the first position on the sliding trough.

23. The system of claim 22, wherein the first movement of the sliding module results in displaying the first sub-report.

24. The system of claim 22, wherein moving the sliding module from the second position on the sliding trough to the right along the sliding trough to the first position results in hiding the first sub-report.

25. A non-transitory computer readable medium comprising a plurality of executable instructions for reporting financial data, wherein the plurality of executable instructions comprises instructions to:
   display a report of the financial data at a first level of granularity of a plurality of levels of granularity and a report slider,
      wherein the report comprises a first plurality of line items,
      wherein the report slider comprises a sliding module in a first position, and
      wherein each of the plurality of levels of granularity define a level of detail about selected line items of the first plurality of line items;
   receive a selection of a first line item and a second line item of the first plurality of line items;
   detect a first movement of the sliding module on the report slider from the first position to a second position,
      wherein the second position of the sliding module with respect to the report slider defines a second level of granularity of the plurality of levels of granularity of the financial data of the first line item and the second line item,
      wherein the second level of granularity provides an additional level of detail for the first line item and the second line item, and
      wherein the additional level of detail comprises a plurality of components of the first line item and the second line item;
   generate, based on the second position of the sliding module and the selection of a first line item and a second line item, a first sub-report for the first line item and a second sub-report for the second line item, wherein the first sub-report and the second sub-report display the financial data of the first line item and the second line item at the second level of granularity; and
   display the first sub-report and the second sub-report with the report.

* * * * *